May 5, 1970     C. J. MANGIARACINA ET AL     3,510,657

OPTICAL MULTIPLEXING APPARATUS

Filed March 30, 1967     4 Sheets-Sheet 3

INVENTORS
CHARLES J. MANGIARACINA
& CHARLES B. MEYER

By W. H. Sprague
Attorney

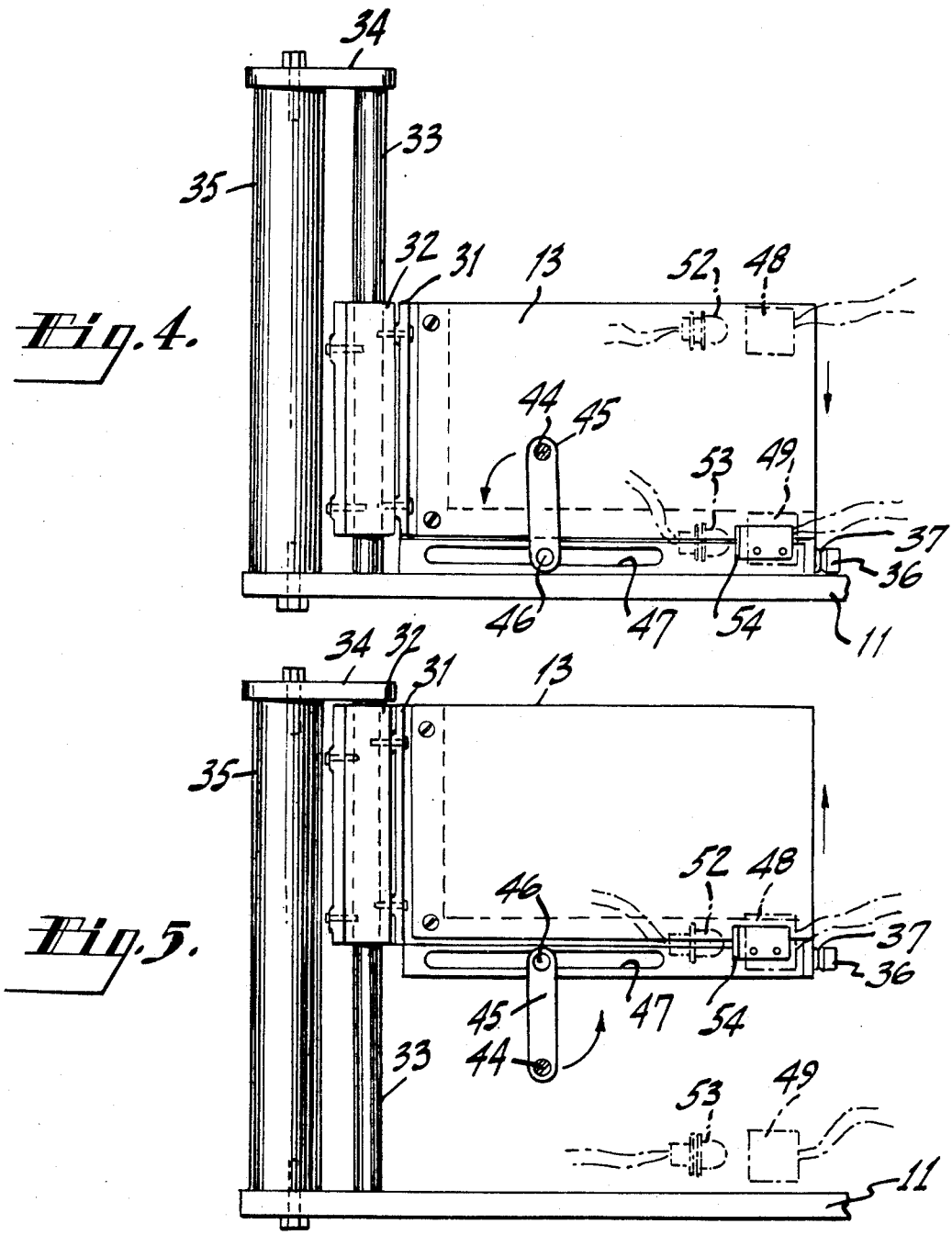

United States Patent Office 3,510,657
Patented May 5, 1970

3,510,657
OPTICAL MULTIPLEXING APPARATUS
Charles J. Mangiaracina, Cherry Hill, N.J., and Charles
B. Meyer, Ardmore, Pa., assignors to RCA Corporation, a corporation of Delaware
Filed Mar. 30, 1967, Ser. No. 627,063
Int. Cl. H04n 5/24; G02b 27/10; G03b 21/28
U.S. Cl. 250—201                                     8 Claims

ABSTRACT OF THE DISCLOSURE

A plurality of mirrors movable between upper and lower positions selectively control light paths from any one of a plurality of film projectors to one or more television cameras. Each mirror is raised and lowered by movement, in a horizontal supporting bracket slot, of a pin in a motor driven vertically rotating crank. Each motor is automatically deenergized by interrupting light to a photocell at each upper and lower mirror positions.

This invention relates to television studio apparatus used in combination with film projectors and television cameras and particularly to the optical apparatus for directing light from a selected film projector to a selected camera.

Most television studios are equipped with several film projectors, both movie and slide and one or more cameras. It is necessary to be able to switch the input to a television camera from a selected one of the film projectors. For this purpose, apparatus known as an optical multiplexer is used and consists, essentially of a plurality of mirrors centrally located relative to the film projectors and the television cameras. By placing one or more of the mirrors suitably with respect to the light path from the film projectors, the light from any selected one of the projectors may be directed to the television camera. The optical multiplexer apparatus, therefore, must be capable of operation so as to selectively operate the mirrors used singly or in combination with others in order to accomplish the desired light direction.

In a typical operation, the television program may originate at one of the movie projectors. At times when it is desired to interrupt the program and insert a commercial message, for example, the light path from the movie projector to the camera is interrupted and a light path from another projector, either movie or slide, is established to the television camera. The interruption of one light path and the establishment of another is accomplished by means of the mirrors comprising the optical multiplexer. In order not to interrupt the operation of the studio, it is necessary, therefore, that the multiplexer mirrors be operated by a mechanism which is fast acting. Also, the transmission from one source of film material to another should be made with a minimum or no distortion of either of the images. Furthermore, the interchange of mirrors should be accomplished by a mechanism which is provided with positive indexing means so that the mirror or mirrors involved in the light transfer may be positioned with a high degree of precision.

The optical multiplexer embodying the present invention, comprises a plurality of mirrors which are selectively movable into and out of a light path. The mechanism for moving each of the mirrors is substantially the same for each mirror. It includes a vertical stationary shaft on which a carriage is mounted for sliding movement longitudinally thereof. A bracket which supports the mirror is rigidly attached to the carriage and is provided with a horizontally extending slot adjacent its lower edge. A motor driven horizontal rotatable shaft has attached thereto one end of a crank arm, on the other end of which a roller is mounted and is maintained in engagement with the slot on the mirror-supporting bracket. Rotation of the motor drive shaft produces vertical translation of the mirror-supporting bracket through the agency of the crank-supported roller and the bracket slot.

The closure of a control circuit energizes the electrical motor which drives the rotatable shaft, thereby initiating vertical movement of the associated mirror. When the mirror reaches either the top or the bottom of its vertical movement, an opaque flag carried by the mirror-supporting bracket interrupts a light beam from a lamp to a photo cell. The signal thus generated by the photo cell deenergizes the motor by the operation of a braking system prevents more than one complete revolution of the motor shaft after the motor deenergization.

For a more complete description of the apparatus embodying this invention, reference may be made to the following specification which is taken in conjunction with the accompanying drawings of which:

FIG. 4 is a sectional view taken along the line 4—4 of FIG. 3 showing one of the mirrors in its lower position;

FIG. 5 is a view similar to FIG. 4 showing the mirror in its upper position;

FIG. 7 is a schematic circuit diagram of the general arrangement of the motor control system.

Figure 1:
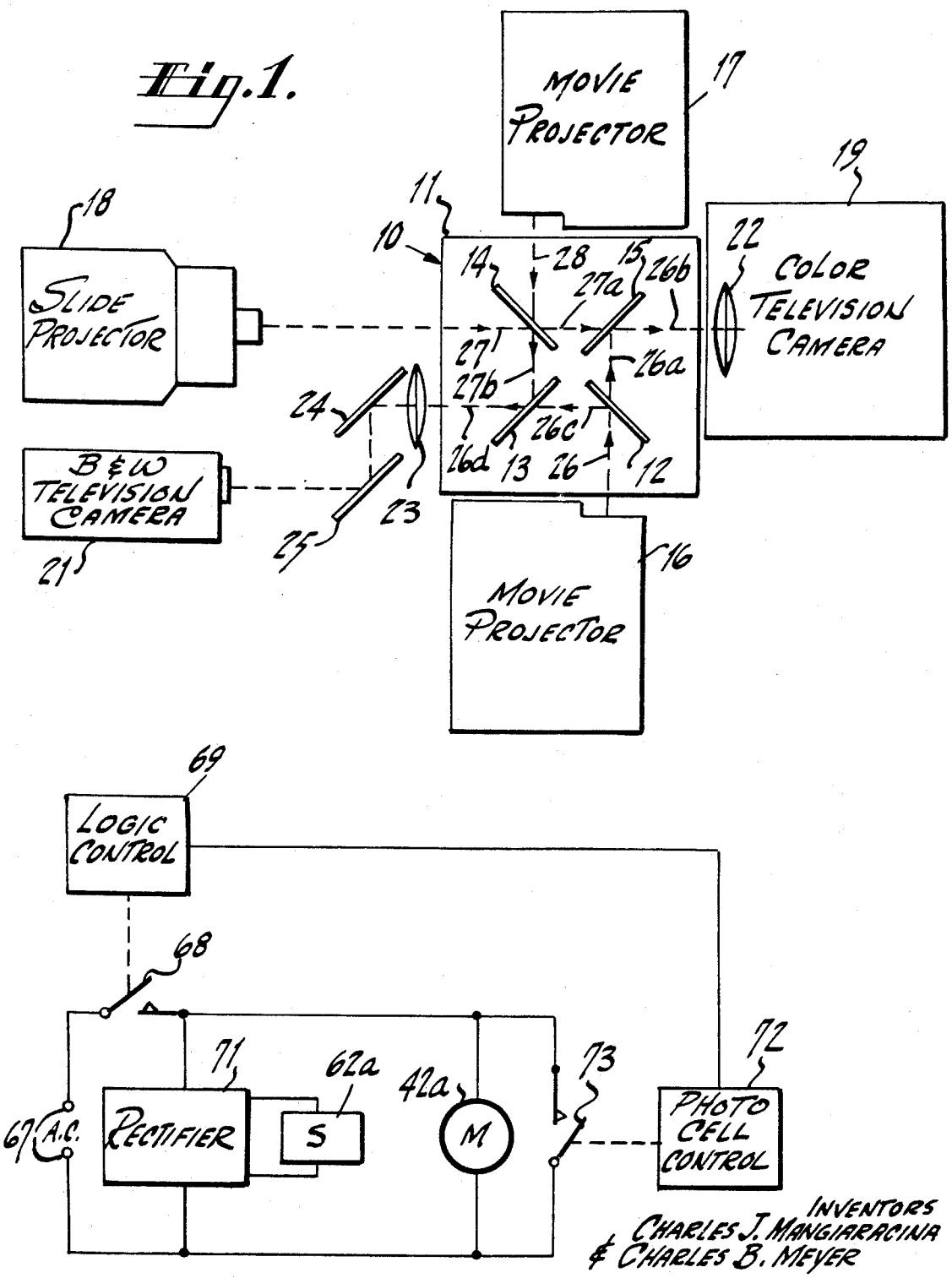
FIG. 1 is a plan view of a typical layout of an optical multiplexer, two movie projectors, one slide projector, a color television camera and a black and white television camera.

In FIG. 1 the optical multiplexer 10 comprises a base 11 which supports movable mirrors 12, 13, 14 and 15, and is located substantially centrally between movie projectors 16 and 17, slide projector 18, color television camera 19 and black and white television camera 21. Each of the projectors and cameras is oriented at right angles to the four sides of the multiplexer base 11. The movable mirrors 12, 13, 14 and 15 are located at 45° angles to the light paths from the projectors and to the cameras. Mirror 14 reflects from both surfaces, the rest are only reflective from one surface. The color television camera 19, has a field lens 22 at which light from any of the projectors 16, 17 and 18 may be imaged. Also, light from any of these projectors may be imaged into the plane of a field lens 23 associated with the black and white television camera 21. Stationary mirrors 24 and 25 also are included in the light path to the black and white camera.

When it is desired to direct light from the projector 16 onto the color television camera 19, for example, the multiplexer mirror 12 is lowered out of the light path 26 so that the path 26a extends to the mirror 15 which is in its raised position, thereby directing the light along the path 26b to the field lens 22 of the color television camera 19. If it is desired to interrupt light from the projector 16 and to direct light from the slide projector 18 to the color television camera 19, mirrors 14 and 15 are lowered allowing light from the slide projector 18 to reach the television camera by paths 27, 27a and 26b. Alternatively, if it is desired to interrupt the light from the movie projector 16 and to direct light from movie projector 17 onto the color television camera 19, mirror 14 is raised and mirror 15 is lowered. Light from movie projector 17 then, is directed along paths 28, 27a and 26b to the field lens 22 of the color television camera 19. When either the movie projector 17 or the slide projector 18 is used with the color television camera 19, the position of the mirror 12 is immaterial because, with the mirror 15 in its lowered position, no light from the movie projector 16 can reach the color television camera.

When it is desired to direct light from the movie projector 16 onto the black and white television camera 21, mirror 12 is raised and mirror 13 is lowered, the light then following the path 26, 26c and 26d to the field lens 23 from which it is reflected first by mirror 24 and then by mirror 25 onto the camera 21. Light from slide projector 18 is directed to the black and white camera 21 by placing mirrors 13 and 14 in their upper positions, the light then following the paths 27, 27b and 26d to the field lens 23. In a similar manner, light from movie projector 17 is directed to the black and white camera 21 by lowering mirror 14 and placing mirror 13 in its upper position, the light following the paths 28, 27b and 26d to the field lens 23.

The optical multiplexer may also be used to preview the film in projector 17 while the film in projector 16 is being used for the production of transmitted signals from camera 19. With mirrors 12 and 14 in their lower positions and mirrors 13 and 15 in their upper positions, light from projector 16 follows the paths 26, 26a and 26b to the color camera 19 and light from projector 17 follows the paths 28, 27b and 26d to the black and white camera 21. A monitor (not shown) connected to receive signals from the black and white camera 21 enables the desired previewing. Similarly, with mirrors 13 and 15 in their lower positions and mirrors 12 and 14 in their upper positions, the film in projector 16 may be previewed from the black and white camera 21 while the film in projector 17 is used to generate signals for transmission from the color camera 19.

Figure 2:
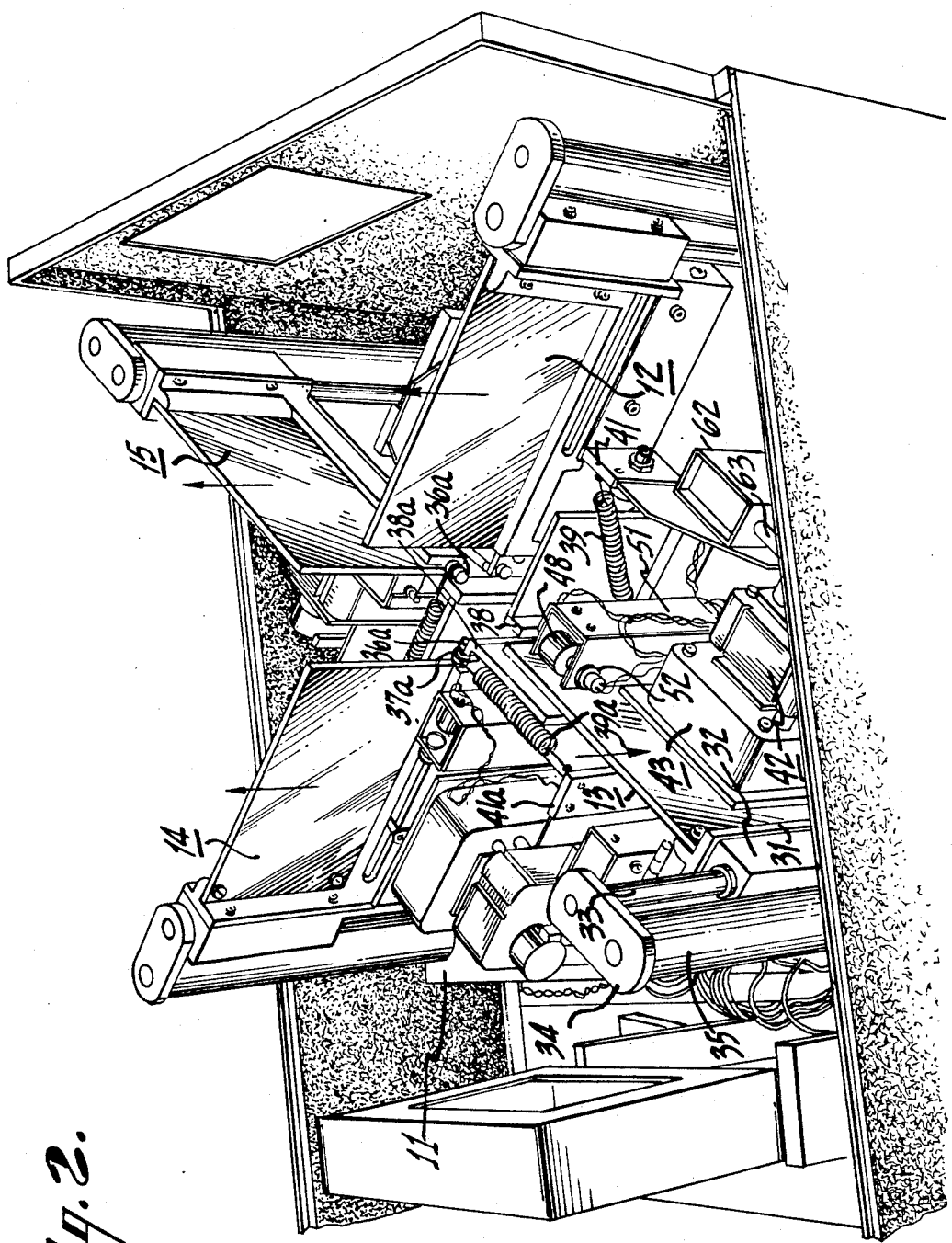
FIG. 2 is a perspective view showing the general arrangement of the multiplexer.

In the perspective view of the multiplexing apparatus of FIG. 2, the mirrors 12, 14 and 15 are shown in their upper positions and mirror 13 is shown in its lower position. The mounting and operating mechanism for all of the mirrors is identical. Therefore, only the apparatus for mounting and operating one of the mirrors will be described in detail. Since the perspective view of FIG. 2 is intended primarily to illustrate the interrelationships of all four of the mirrors, all details of such apparatus pertaining to any selected one of the mirrors is not visible in this figure. Hence, additional reference will be made to detailed FIGS. 3, 4, 5 and 6 which are primarily illustrative of the mounting and operating apparatus for the mirror 13. This mirror is supported in an L-shaped bracket 31, the vertical leg of which is rigidly attached to a carriage 32. This carriage is mounted for sliding movement longitudinally of a substantially vertical stationary shaft 33. The vertical shaft 33, in turn, is secured at its lower end to the base 11 and its upper end is attached by means of a bracket 34 to a vertical post 35 having its lower end securely attached to the base 11.

As seen more clearly in FIGS. 4 and 5, the horizontally extending arm of the mirror-supporting bracket 31 has an extension on its end opposite to that which is attached to the carriage 32 and on which is mounted a roller 36 and an annularly grooved sleeve 37. The roller 36 is urged into engagement with a vertical guide rail 38 (FIG. 2) by means of a spring 39 attached at one end to the grooved sleeve 37 on the mirror-supporting bracket 31 and at the other end to a fixed bracket 41 extending upwardly from the base 11. The roller, spring and guide rail relationship is better shown in FIG. 2 by the spring 39a, the roller 36a and the guide rail 38a associated with the mirror 14. The sliding movement of the carriage 32 along the vertical shaft 33 insures that the end of the mirror attached to the vertical leg of the supporting bracket 31 moves in a vertical plane. The engagement of the roller 36 with the vertical guide rail 38 insures that the movement of the mirror always is in the same vertical plane at the desired angle relative to the film projector and the camera.

Figures 3, 6:
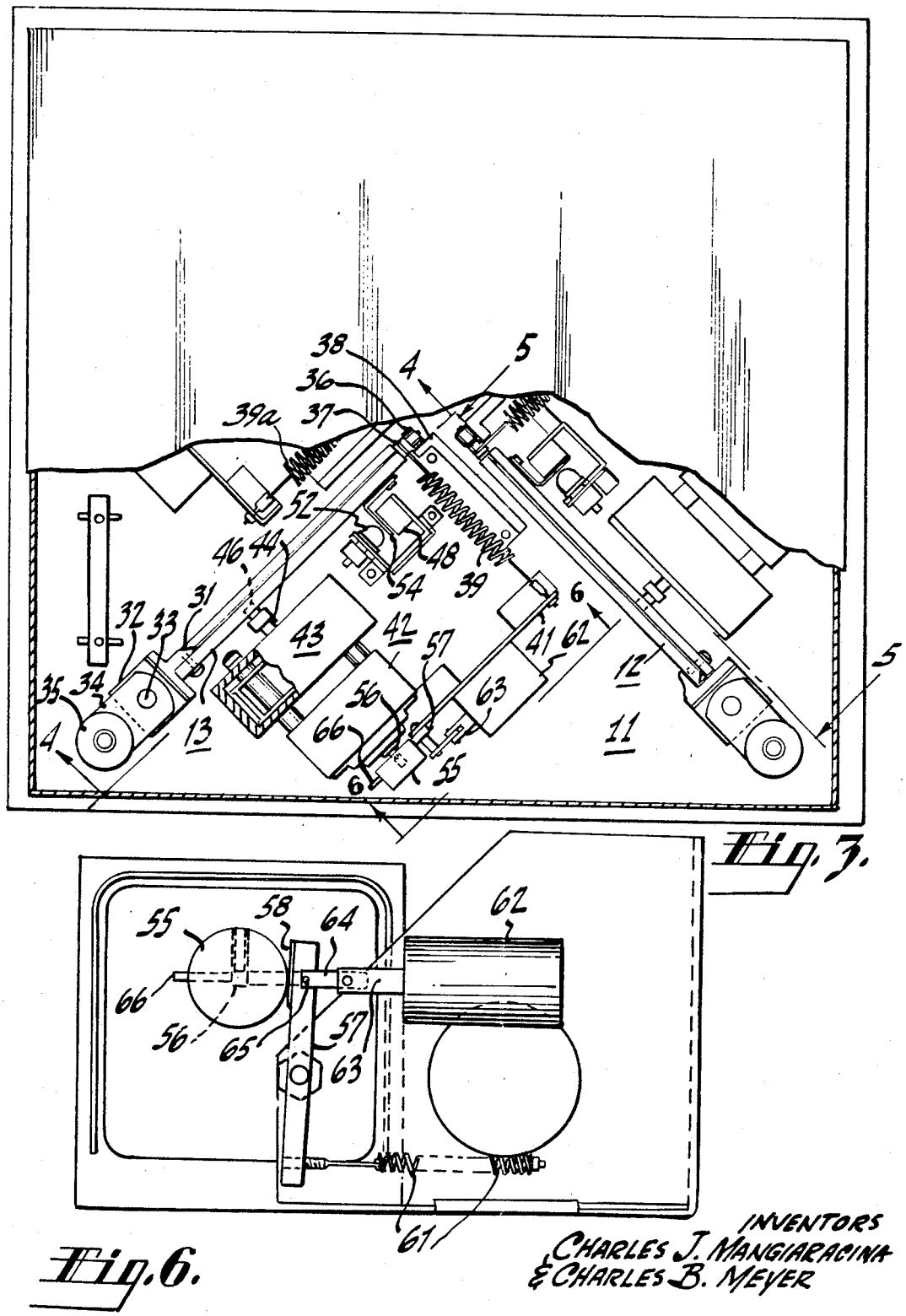
FIG. 3 is a plan view of one unit of the optical multiplexer.
FIG. 6 is a sectional view taken along the line 6—6 of FIG. 3 showing the mechanical braking and indexing system for the operating motor.

Each of the mirrors is raised and lowered by means of an associated motor 42 (FIG. 2) which is mechanically linked through a reduction gear train 43 to a rotatable, horizontal shaft 44 shown better in FIGS. 3, 4 and 5. A crank arm 45 is securely attached at one end to the rotatable horizontal shaft 44 and carries at its other end a roller 46 which is engaged with a horizontal slot 47 formed in the horizontal leg of the mirror-supporting bracket 31. When the shaft 44 is rotated counterclockwise, for example, under the control of the motor 42, the crank arm roller 46, by its engagement with the slot 47 of the mirror-supporting bracket 31, raises the bracket and the mirror supported thereby from a lower position as shown in FIG. 4, to an upper position as shown in FIG. 5. Further rotation of the shaft 44 and crank arm 45 in a counterclockwise direction will lower the mirror from the position shown in FIG. 5 to that shown in FIG. 4. Thus, it is seen that the mirror is raised and lowered by a mechanism which always rotates in the same direction, thereby obviating the need for a motor and/or other apparatus which is required to operate in opposite directions for the raising and lowering movements of the mirror.

The multiplexing apparatus also includes instrumentalities for automatically arresting the mirror-moving apparatus when the mirror has reached its upper lower position. This apparatus includes photo cells 48 and 49 mounted in a bracket 51, respectively in upper and lower positions relative to the mirror 13. Associated with the respective photo cells 48 and 49 are lamps 52 and 53, also mounted in the bracket 51. Light falling upon either photo cell from its associated lamp produces a given signal which is modified if the light is modified or interrupted. When the mirror 13, for example, has reached its lower position as shown in FIG. 4, an opaque flag 54 mounted on the horizontal leg of the mirror-supporting bracket 31 is moved into a position between the lamp 53 and the photo cell 49, thereby interrupting the light to the photo cell. As will be described in greater detail subsequently, the output signal from the photo cell 49 is effective to deenergize the associated motor 42 so as to leave the mirror 13 in its lower position. In a similar manner, the flag 54 interrupts the light to the photo cell 48 from its associated lamp 52 when the mirror 13 reaches its upper position as shown in FIG. 5, thereby deenergizing the operating motor 42 and leaving the mirror in this position.

It is to be especially noted that, by reason of the crank arm 45, the roller 46 and slot 47 arrangement for raising and lowering the mirror, a motor having only a relatively low starting torque is required because, in the first few angular degrees of movement of the crank arm 45, the vertical component of movement of the roller 46 is comparatively small and increases only after the motor has reached its running speed. Thus, any substantial mechanical load on the motor is not applied until the motor is up to speed. As the mirror approaches either its upper or lower position, the vertical component of the roller 46 movement is again relatively small so that the mechanical load on the motor 42 is reduced substantially to zero when the mirror reaches its desired position. Consequently, the motor may be brought completely to rest substantially instantaneously after it is deenergized.

After the motor 42 is deenergized under the control of one of the photo cells 48 or 49, it is stopped substantially, instantaneously, by a combination of electrical and mechanical means. The electrical means will be further described subsequently. As shown in FIG. 6, the mechanical means includes a brake roller 55 mounted on the outer end of the rotor shaft 56 (FIG. 3) of the motor 42. A brake arm 57 having a brake shoe 58 is pivoted about an axis 59 and urged by a spring 61 to bring the shoe 58 into frictional engagement with the roller 55. When the motor 42 is energized, a solenoid 62 also is energized to move a plunger 63 to the right as viewed in FIG. 6. A linkage 64 connects the plunger 63 to the brake arm 57 so that energization of the solenoid 62 withdraws the brake shoe 58 from engagement with the roller 55, thereby permitting the motor shaft 56 and the roller 55 to rotate freely.

At the time the motor 42 is deenergized, the solenoid 62 also is deenergized, thereby effecting the re-engagement of the brake shoe 58 with the roller 55 to assist in the bringing of the motor shaft 56 to rest. In addition to the described mechanism, the brake arm 57 also is provided with a pin 65 extending laterally therefrom to a point beyond the brake shoe 58. An indexing pin 66 extends radially from the brake roller 55 at a point which also is laterally displaced from the surface on which the brake shoe 58 engages the roller. The indexing pin is, thus, located, suitably to engage the pin 65 of the brake arm 57 when the latter is in its released position with the brake shoe 58 in contact with the roller 55. By such means, rotation of the motor shaft 56, after deenergization of the motor 42, is limited in further rotation to a maximum of one revolution. Because of the inclusion of the reduction gear train 43 in the linkage between the motor shaft 56 and the horizontally rotatable shaft 44, one revolution of the motor shaft produces only a fractional revolution of the shaft 44 and the crank arm 45. With the crank arm virtually in one of its substantially vertical positions, as viewed in FIGS. 4 and 5 at this time, any small rotational movement of the roller 46 has practically no vertical component, thereby producing no further vertical movement of the mirror 13.

A mirror-operating motor control system is shown in FIG. 7. The motor 42a is energized from an alternating current source at terminals 67 by the closure of a switch 68. The switch closure is effected from a logic control circuit 69 which responds to an operator's selection of a projector-camera combination. The logic control, which forms no part of this invention and is not needed for an understanding of this invention, performs such functions as determining which mirrors must be moved to effect the selected projector-camera combination and, if more than one mirror is to be moved, the sequence in which they are moved. This latter determination is important because, in such a system a camera usually is operated automatically and, hence, must not be left, even for a short time, with no light projected onto it. The reason is that such a camera is provided with video signal-controlled circuits to automatically change its sensitivity and/or to alter the gain controlling facilities of the camera signal amplifier when the light projected onto it falls below a predetermined level. Such a facility is needed for protective purposes in an automatic camera system where no external control of the light is possible, even though it may result in spurious signals momentarily. In the case of the present optical multiplexer, however, it is possible to avoid any light interruption on the camera by rapidly moving the mirrors in the proper sequence.

The closure of the switch 68 also applies alternating current to a rectifier 71 the direct current output of which energizes the solenoid 62a.

When the mirror reaches the end of its vertical movement and modifies the light to an appropriate photo cell, as previously described, a photo cell control circuit 72 functions through the logic control circuit 69 to open switch 68 and to momentarily close a switch 73. The motor 62a, thus, is disconnected from the alternating current terminals 67 and is momentarily short circuited. The motor then functions as a generator and the transient short circuit current operates as a dynamic brake which, together with the previously described mechanical braking, facilities, bring the motor to a substantially instantaneous stop.

What is claimed is:

1. In an optical multiplexer including a plurality of mirrors selectively movable into and out of a light path, apparatus for moving each of said mirrors comprising:
   a stationary vertical shaft;
   a carriage mounted for sliding movement longitudinally of said stationary shaft;
   a mirror-supporting bracket rigidly attached at one of its ends to said carriage and having a horizontally extending slot adjacent its lower edge;
   a rotatable horizontal shaft; and
   a crank arm attached adjacent its one end to said rotatable horizontal shaft and having a first roller mounted adjacent its other end and in engagement with said bracket slot whereby rotation of said horizontal shaft raises and lowers said bracket and the mirror supported thereby said crank arm further attached to said rotatable horizontal shaft and said bracket slot such that said crank arm is parallel to said vertical shaft when said carriage is at its upper and lower extremes of vertical travel for minimizing the torque required to initially rotate said horizontal shaft to move said carriage from its upper and lower extreme positions.

2. In an optical multiplexer as defined in claim 1:
   a horizontal extension on the other end of said mirror-supporting bracket;
   a second roller mounted for rotation on said bracket extension;
   a vertical guide rail; and
   a spring attached to said bracket extension urging said second roller into engagement with said guide rail.

3. In an optical multiplexer as defined in claim 2: an electric motor having a rotor shaft mechanically linked to said rotatable horizontal shaft and energizable to rotate said horizontal shaft.

4. In an optical multiplexer as defined in claim 3:
   upper and lower motor control photo cells and respective light sources therefore located adjacent said mirror; and
   a opaque flag mounted on said mirror-supporting bracket and operative respectively in said raised and lowered mirror positions to interrupt the light to said upper and lower photo cells.

5. In an optical multiplexer as defined in claim 4:
   a brake roller mounted on the rotor shaft on said motor;
   a pivotally mounted brake arm spring-biased into frictional contact with said brake roller; and
   a solenoid having a movable plunger mechanically linked to said brake arm and operative when said solenoid is energized to withdraw said brake arm from contact with said brake roller.

6. In an optical multiplexer as defined in claim 5: a pin radially extending from said brake roller for engagement with said brake arm after said solenoid is deenergizing, thereby limiting further rotation of the rotor shaft of said motor to a maximum of one revolution.

7. In an optical multiplexer as defined in claim 6: a reduction gear train included in said mechanical linkage between the rotor shaft of said motor and said rotatable horizontal shaft.

8. In an optical multiplexer as defined in claim 4: motor braking means including switching means responsive to signals from said motor control photocells for interrupting the electric power coupled to input terminals of said motor and for momentarily shorting said input terminals for providing dynamic braking action for said motor.

References Cited

UNITED STATES PATENTS 2,496,936 2/1950 Clutz et al. _____ 318—480 X
2,525,957 10/1950 Schuler _____ 353—48

FOREIGN PATENTS 549,271 10/1956 Italy.
874,676 8/1961 Great Britain.

JAMES W. LAWRENCE, Primary Examiner
E. R. LA ROCHE, Assistant Examiner

U.S. Cl. X.R.

178—7.2; 318—480; 350—171, 289; 353—82